United States Patent
Zhang (10) Patent No.: US 12,468,950 B2
(45) Date of Patent: Nov. 11, 2025

(54) ANN-BASED PROGRAM TESTING METHOD, TESTING SYSTEM AND APPLICATION

(71) Applicant: ZUNYI VOCATIONAL AND TECHNICAL COLLEGE, Zunyi (CN)

(72) Inventor: Huachen Zhang, Zunyi (CN)

( * ) Notice: Subject to any disclaimer, the term of this patent is extended or adjusted under 35 U.S.C. 154(b) by 237 days.

(21) Appl. No.: 17/783,298

(22) PCT Filed: Dec. 3, 2020

(86) PCT No.: PCT/CN2020/133517
§ 371 (c)(1),
(2) Date: Jun. 8, 2022

(87) PCT Pub. No.: WO2021/115186
PCT Pub. Date: Jun. 17, 2021

(65) Prior Publication Data
US 2023/0032058 A1    Feb. 2, 2023

(30) Foreign Application Priority Data
Dec. 9, 2019  (CN) .......................... 201911253427.1

(51) Int. Cl.
  G06F 11/3668    (2025.01)
  G06N 3/084    (2023.01)

(52) U.S. Cl.
  CPC ......... *G06N 3/084* (2013.01); *G06F 11/3684* (2013.01); *G06F 11/3688* (2013.01)

(58) Field of Classification Search
  None
  See application file for complete search history.

(56) References Cited

U.S. PATENT DOCUMENTS 10,810,491 B1 * 10/2020 Xia .......................... G06N 3/04
2004/0220891 A1 * 11/2004 Dodgson ................ G06N 3/049
  706/12

(Continued)

FOREIGN PATENT DOCUMENTS

CN    105843743 A    8/2016
CN    111026664 A    4/2020

OTHER PUBLICATIONS

Vanmali, M., Last, M. and Kandel, A. (2002), Using a neural network in the software testing process. Int. J. Intell. Syst., 17: 45-62. (Year: 2002).*

(Continued)

*Primary Examiner* — Jason D Mitchell
(74) *Attorney, Agent, or Firm* — Addison D. Ault; IPGentleman Intellectual Property Services, LLC (57) ABSTRACT

An artificial neural network (ANN)-based program testing method, which tests a target program on which functions and codes are run. The method includes constructing a test model by means of an ANN, then inputting input values of a target program into the test model, and computing test output values according to the test model; then inputting the input values into the target program so as to obtain actual output values; and selecting, according to deviations between the test output values and the actual output values that correspond to the same input values, input values corresponding to top-ranked 50 to 150 deviations, transmitting the selected input values to the target program for running, comparing running results with an actual functional requirement, and determining that the target program has a defect under the condition that one of the running results does not satisfy the actual functional requirement.

3 Claims, 3 Drawing Sheets

(56) References Cited

U.S. PATENT DOCUMENTS

| | | | | |
|---|---|---|---|---|
| 2007/0130491 | A1* | 6/2007 | Mazumder | G01R 31/3177 |
| | | | | 714/736 |
| 2007/0162894 | A1* | 7/2007 | Noller | G06F 11/3688 |
| | | | | 717/124 |
| 2008/0184371 | A1* | 7/2008 | Moskovitch | G06F 21/566 |
| | | | | 706/12 |
| 2008/0319933 | A1* | 12/2008 | Moussa | G06N 3/084 |
| | | | | 706/31 |
| 2017/0082988 | A1* | 3/2017 | Ross | G05B 13/0265 |
| 2019/0221001 | A1* | 7/2019 | Dassa | G06N 3/045 |
| 2019/0245754 | A1* | 8/2019 | Greene, Jr. | H04L 41/145 |
| 2019/0251434 | A1* | 8/2019 | Wu | G06N 3/04 |
| 2020/0134451 | A1* | 4/2020 | Baker | G06N 3/047 |
| 2020/0293892 | A1* | 9/2020 | Zhou | G06F 18/20 |
| 2020/0394559 | A1* | 12/2020 | Zhang | G06N 20/00 |
| 2020/0409827 | A1* | 12/2020 | Chenguttuvan | G06F 18/2185 |
| 2021/0034500 | A1* | 2/2021 | Budnik | G06N 3/08 |
| 2021/0073627 | A1* | 3/2021 | Sarferaz | G06N 3/08 |
| 2022/0155275 | A1* | 5/2022 | Zuo | G01N 33/2823 |
| 2022/0300820 | A1* | 9/2022 | Zhang | G06N 3/084 |

OTHER PUBLICATIONS

International Search Report issued in International Application No. PCT/CN2020/133517; mailed Feb. 26, 2021; 7 pgs.

Written Opinion issued in International Application No. PCT/CN2020/133517; mailed Feb. 26, 2021; 7 pgs.

Search Report issued in Chinese Application No. 201911253427.1; mailed May 19, 2020; 1 pg.

First Office Action issued in Chinese Application No. 201911253427.1; mailed May 25, 2020; 17 pgs.

Second Office Action issued in Chinese Application No. 201911253427.1; mailed Jun. 16, 2020; 18 pgs.

\* cited by examiner

ANN-BASED PROGRAM TESTING METHOD, TESTING SYSTEM AND APPLICATION

RELATED APPLICATIONS

The present application is a U.S. National Phase of International Application Number PCT/CN2020/133517, filed Dec. 3, 2020, and claims priority to Chinese Application Number 201911253427.1, filed Dec. 9, 2019.

TECHNICAL FIELD

The present disclosure belongs to the software testing technology, and particularly relates to a software function error testing method and a system for constructing a software testing model.

BACKGROUND ART

Software testing is a process for evaluating the correctness, integrity, security and quality of software. In other words, it is a process of audit or comparison between actual output and expected output.

After long-term experience accumulation and technical improvement, several software testing methods have been developed and matured, basically including a static testing method, a dynamic testing method, a black-box testing method and a white-box testing method. The four testing methods have different advantages corresponding to different software. In actual application, a mixed testing method is often used, and a simple program can also be tested separately. The specific functions and concepts of the four testing methods are publicly known technologies, so they will not be repeated herein.

Black-box testing is to test whether software functions satisfy expected requirements, by observing data output through data input, and checking whether internal functions of software are normal, so as to determine whether software functions are normal as much as possible. Theoretically speaking, the black-box testing can find all errors in a program only by considering all possible input data as testing cases through exhaustive input testing. The testing cases are actually infinite. Not only all legal input data but also illegal but possible input data need to be tested. In this way, complete testing is impossible, so targeted testing is required, and testing is guided through design of test cases, so as to ensure that software testing is conducted in an organized and step-by-step planned manner. A black-box testing behavior can truly ensure software quality only through quantification, and test instances are one of methods for quantifying testing behaviors concretely.

In a process of constructing the test instances, it is necessary to know the software functions to be realized, and software rules, that is, to construct test cases according to their functions because of many function points. Test case documents need to be written based on document templates, which satisfy an internal specification requirement.

Instances of basic events should be designed with reference to an instance specification (or a design specification), and the test instances should be designed through path analysis according to related functions and operations. Strong logicality and professionalism are required to flexibly use various methods to design complete test instances. Now, accurate test instances are designed only by depending on rich experience and careful design of test designers.

After the concept of an artificial neural network (ANN) appears, researchers have gradually applied it to the field of software testing. The ANN is capable of "self-learning". At present, a neural network is used for software testing, mainly for forming accurate test instances. For example, in the master's thesis "Research and application of software defect testing and predicting technology based on BP neural network" of Lv Shanshan, a back propagation (BP) neural network is used to test software. The research focus of the paper is to use a probability of the ANN for a section of algorithm program (function) and form input and output values of the algorithm program into an "input and output value set", and to use the input and output value set as the basis of constructing the ANN. The formed "ANN model" has the same functions with the tested "algorithm program".

Although the viewpoint of the paper well proves that a model constructed by the "ANN" can be functionally equivalent to the "algorithm program" providing the "input and output set". However, the paper has not given any guidance on testing whether an "algorithm program" with unknown function, structure and program complexity has errors, and test instances cannot be obtained through the above method.

In actual engineering application, to speed up the market access of "software", enterprises can outsource the "software testing" link to an organization specialized in "software testing". The awareness of intellectual property is gradually attached importance to, so during outsourcing, they, actually, do not want to disclose the "source code" and "requirement specification" to the software testing organization. In view of this, the "source code" can be encrypted, and the testing organization can only test whether a function of the "source code" is correct in a mode similar to "black-box testing".

The tested "source code" is also called a target program in the following.

Because an internal condition of the tested "source code" (hereinafter referred to as "the target program") is unknown in a testing process, computation corresponding to the "source code" to be tested is often very complicated. Input values are infinite variables. In this case, the input values cannot be verified one by one through "traversing". As a result, whether a function of the target program is correct can be verified only by using some randomly input data. However, a timely output result is completely consistent with an expected result, and whether the function of the target program is correct cannot be determined. Even if there are limited input values, if an input amount is very large, it will be a waste of resources to verify them one by one.

SUMMARY

An objective of the present application is to provide an artificial neural network (ANN)-based program testing method, so as to solve the problem that an effective test input value cannot be obtained under the condition that an actual requirement of a target program and a structure of the target program itself are unknown.

To realize the objective and solve the problem, the present application provides the ANN-based program testing method. The method includes the following steps:

S1, routine testing: conducting code and function implementation tests on a target program, so as to ensure normal running of the target program;

S2, obtaining a test model: using an ANN trainer to construct an initial model of an ANN, using input values and corresponding output values of the target program as training samples, visualizing the constructed ANN model by means of simulation software, training the initial model by means of the training samples, stopping adding training samples when the initial model is in a convergent state, and defining a convergent model as the test model;

S3, selecting test output values: taking all the input values under the condition that an input value range of the target program is less than one million, if not, taking and inputting at least one million random input values of the target program into the test model, and computing the test output values according to the test model;

S4, selecting actual output values: taking and inputting the same input values in S3 into the target program, so as to obtain the actual output values;

S5, screening the input values: comparing the test output value and the actual output value that correspond to the same input value; sorting deviations from largest to smallest under the condition that there is a deviation between the test output value and the actual output value, and selecting input values corresponding to top-ranked 50 to 150 deviations; and obtaining a test value for testing whether the target program is correct; and S6, storing the test value in S5 in a reproducible storage medium.

Through the method, 50 to 150 test values may be found accurately. See the description in embodiments for details.

Application of the test values found through the method includes: transmitting the test value in S6 to the target program for running, and comparing running results with an actual functional requirement; determining that the target program has a defect under the condition that one of the running results does not satisfy the actual functional requirement; and if not, determining that the target program is a program satisfying a requirement.

In S2, the initial model of the ANN is a back propagation (BP) neural network model; the input values of the target program are used as an input layer; and the output values obtained by running the input values through the target program are used as an output layer. The initial model of the ANN is the BP neural network model; the input values of the target program are used as the input layer; the output values obtained by running the input values through the target program are used as the output layer; and the number of nodes in the input layer or the output layer is 32.

In a training process, the BP neural network model uses an activation function:

$$f(x) = \frac{1}{1+e^{-x}};$$

when $f(x)$ is less than 0.5, an output value of an output layer node is 0; and when $f(x)$ is greater than or equal to 0.5, the output value of the output layer node is 1.

An output value of a hidden layer satisfies:

$$h_m = f\left(\sum_{j=1}^{32} i_j w(j, m)\right)(m = 1, 2, \ldots, k),$$

where $w(j,m)$ indicates a weight from an input layer node to a hidden layer node, and k is the number of nodes in the hidden layer.

An output value of the output layer satisfies:

$$o'_n = f\left(\sum_{m=1}^{k} h_m w'(m, n)\right)(n = 1, 2, \ldots, 32),$$

where $w'(m,n)$ indicates a weight from a hidden layer node to the output layer node.

A deviation satisfies:

$$d = \sum_{n=1}^{32} |o'_n - o_n|,$$

where $o_n$ indicates an output value of function implementation.

An error back propagation algorithm is used to compute weights $w(j,m)$ and $w'(m,n)$, which includes two processes: forward propagation of information and backward propagation of errors. The input layer is configured to receive input information from outside and transmit the information to the hidden layer. The hidden layer changes the information and sends the information to the output layer. The whole process is a positive propagation process. When actual output does not match expected output, a wrong backward propagation stage may be entered. Via the output layer, the errors correct a weight of each layer according to a gradient drop, and are returned to the hidden layer and the input layer.

In a process of training the BP neural network model, curve changes are observed by means of the simulation software; and the processes of the forward propagation of information and the backward propagation of errors are processes of constantly adjusting the weight of each layer, which may be intuitively reflected in the curve changes, that is, a process of learning and training a neural network.

To reduce working strength, under the condition that a range of the input values in the training samples is less than one million, all the input values are used as the training samples, and if not, one million input values are randomly selected as the training samples. For a current computer level, computation of one million data may be basically completed in a few seconds, and meanwhile, according to feedback output from a curve, the BP neural network model may be trained to mature and reach a convergent state by selecting one million data.

In conclusion, according to the advantages of the testing method in the present application, under the condition that it is known that there is an executable program code but a function is completely unknown, the solution obtains corresponding output by calling the target program, uses input and output as the training samples for training the ANN, obtains the ANN model with similar function to a target function, and computes the output values by means of the input values according to the model. If there is a problem in the target function, there will be a big deviation between the output value computed according to the model and an output value of the target function that corresponds to the same input value.

If output values having top 50 deviations are selected, an output value corresponding to a deviation caused by the target function itself has to be in the rank. The input values corresponding to the output values are delivered to the personnel who know the actual functional requirement of the program, so that the personnel may determine whether there is an error in the target program in a small range, that is, whether the target program has a problem in function implementation may be accurately tested by using small-range data.

To realize the method, the present application further provides an ANN-based program testing system. The system includes: a program basic testing unit configured to preliminarily test a function of a target program and whether the program itself is wrong;

an ANN trainer configured to store various training models, and obtain a convergent ANN model by means of training samples; a curve display that is in signal connection with the ANN trainer and configured to display a convergent state of a model curve in real time; a memory configured to store a computer program; a processor configured to run a whole testing program when executing the computer program; and a readable storage medium configured to transfer data in all devices.

DETAILED DESCRIPTION OF THE EMBODIMENTS

The following detailed description will be made through the specific embodiments:

Embodiment 1

Figure 1:
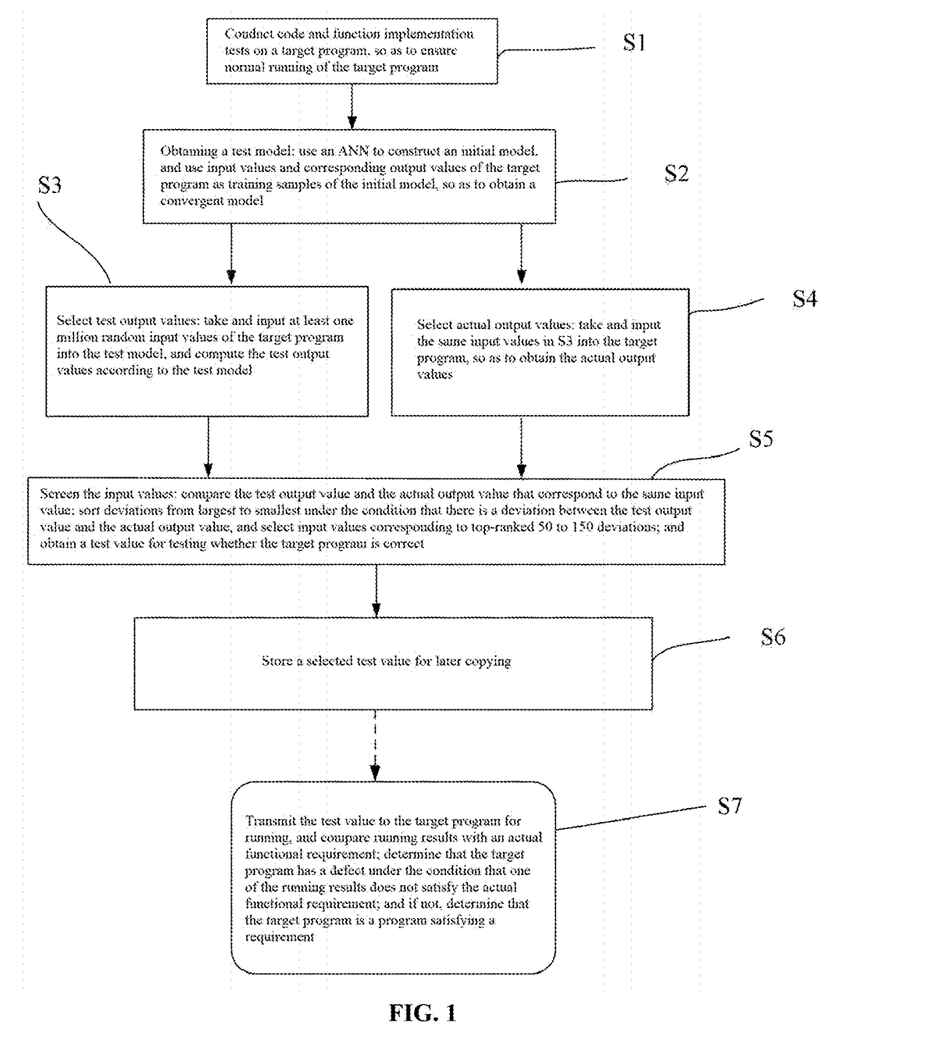
FIG. 1 is a flowchart of a testing method in the solution.

As shown in FIG. 1:
S1, routine testing is conducted: code and function implementation tests are conducted on a target program, and white-box and black-box testing may be often used, so as to ensure normal running of the target program; and the step may only be implemented in a conventional mode, which will not be repeated herein.
S2, a test model is obtained: an artificial neural network (ANN) trainer is used to construct an initial model of an ANN, input values and corresponding output values of the target program are used as training samples, the initial model is trained by means of the training samples, adding of training samples is stopped when the initial model is in a convergent state, and a convergent model is defined as the test model;
S3, test output values are selected: at least one million random input values of the target program are taken and input into the test model, and the test output values are computed according to the test model.
S4, actual output values are selected: the same input values in S3 are taken and input into the target program, so as to obtain the actual output values.
S5, the input values are screened: the test output value and the actual output value that correspond to the same input value are compared; deviations are sorted from largest to smallest under the condition that there is a deviation between the test output value and the actual output value, and input values corresponding to top-ranked 50 to 150 deviations are selected; and a test value for testing whether the target program is correct is obtained.

S6, the test value in S5 is stored in a reproducible storage medium.
Testing application: S7, S6 is delivered to the determination personnel who know the actual functional requirement of the target program; the determination personnel transmit the test value to the target program for running, and running results are compared with the actual functional requirement; the target program is determined to have a defect under the condition that one of the running results does not satisfy the actual functional requirement; and if not, the target program is determined to have neither writing errors nor functional defects.

Embodiment 2

Figure 2:
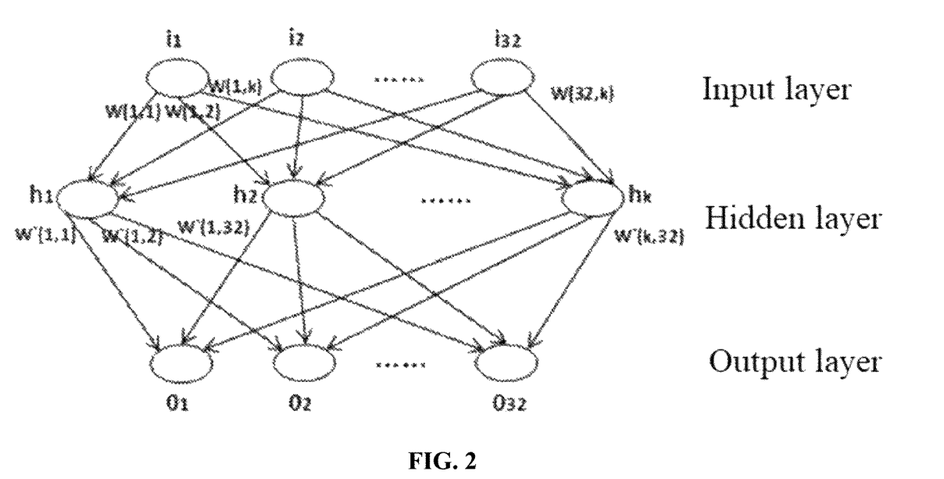
FIG. 2 a structural diagram of a back propagation (BP) artificial neural network (ANN) model.

In a process of executing a program, an ANN is trained in the following modes:
As shown in FIG. 2, a three-layer neural network model is constructed with a BP ANN structure for learning. An input layer node indicating a LabelSpace value before label distribution is 32, a hidden layer node is k, and an output layer node indicating a Label Space value after label distribution is 32.
An activation function is:

$$f(x) = \frac{1}{1+e^{-x}}.$$

An output value of the hidden layer node is:

$$h_m = f\left(\sum_{j=1}^{32} i_j w(j, m)\right)(m = 1, 2, \ldots, k);$$

and w(j,m) indicates a weight from the input layer node to the hidden layer node.
An output value of the output layer node is:

$$o'_n = f\left(\sum_{m=1}^{k} h_m w'(m, n)\right)(n = 1, 2, \ldots, 32);$$

and w'(m,n) indicates a weight from the hidden layer node to the output layer node.
A deviation is defined as:

$$d = \sum_{n=1}^{32} |o'_n - o_n|,$$

where $o_n$ indicates an output value of function implementation or an output value of a requirement.
f(x) is between 0 and 1, but the output value of the output layer node has to be an integer 0 or 1, so it is stipulated that when f(x) is less than 0.5, the output value of the output layer node is 0; and when f(x) is greater than or equal to 0.5, the output value of the output layer node is 1.
An error BP algorithm is used to compute weights w(j,m) and w(m,n), and includes two process: forward propagation of information and backward propagation of errors. The input layer is configured to receive input information from outside and transmit the information to the hidden layer. The hidden layer changes the information and sends the information to the output layer. The whole process is a positive propagation process. When actual output does not match the expected output, a wrong backward propagation stage may be entered. Via the output layer, the errors correct a weight of each layer according to a gradient drop, and are returned to the hidden layer and the input layer. The processes of the forward propagation of information and the backward propagation of errors are processes of constantly adjusting the weight of each layer, that is, a process of learning and training a neural network.

Although the embodiment uses the BP ANN model to construct the test model, it is not limited to using only the type of the ANN model to construct the test model.

Embodiment 3

Through actual testing and observation of a target function having a defect, an arithmetic unit with 32-bit memory is selected at first. Because internal data is expressed in binary mode, whether a defect may be found accurately may be known by directly observing a 0/1 change of a corresponding position, specifically, a 32-bit binary integer is used to indicate 32 labels (a 0th bit indicates label 0, a 1st bit indicates label 1, and so on); if a value of any bit is 0, it is indicated that no label is distributed; and if a value of any bit is 1, a corresponding label is distributed.

A state change of the corresponding position may be identified through computer programming so as to complete automatic identification. An automatic identification method includes:

S2: If a label is greater than or equal to a distributed number, label distribution is conducted according to Table 1 and 0 is returned; and if not, 1 is returned.

Looking is started from a low position to a high position; and in a range set having the number of continuous idle labels greater than or equal to the number of required distributed labels, the minimum number of continuous idle label range elements that appear for the first time is found.

Labels are distributed from lowest to highest in the elements found above.

The function implementation of Assign_Label_Func( ) is given below. Because a code passes basic function and code correctness tests, the code may be executed, and effective output may be generated according to input.

A complete code implementation mode:

```
int Assign_Label_Func(i nt AssignNum)
{
    unsigned long int TempLabel;
    int MaxContinueLabelNum=0, Order = 0;
    int TempMax=0, TempOrder=0;
    int Flag=0, change=0, i, k;
    TempLabel=LabelSpace;
    for(i=0; i<32; i++)
    {
            if((TempLabel & 0x01)==0)
        {
          if(Flag== 1)
          {
TempOrder=i;
Flag=0;
          }
             TempMax=TempMax+1;
        }
        else
        {
          if(Flag == 0)
          {
```

```
             if(MaxContinueLabelNum<AssignNum)
        {
           if(TempMax>MaxContinueLabelNum)
           {
                   MaxContinueLabelNum=TempMax;
               Order=TempOrder;
           }
        }
        else
        {   if(MaxContinueLabelNum>AssignNum)
               {
               if((TempMax>=AssignNum) &&
                  (TempMax<MaxContinueLabelNum))
               {
                      MaxContinueLabelNum=TempMax;
                  Order=TempOrder;
               }
               }
          }
          Flag=1;
          TempMax=0;
          }
    }
    TempLabel=TempLabel>>1;
}
if(MaxContinueLabelNum<AssignNum)
{
    if(TempMax>MaxContinueLabelNum)
    {
        MaxContinueLabelNum=TempMax;
      Order=TempOrder;
    }
}
else
{
    if(MaxContinueLabelNum>AssignNum)
    {
       if((TempMax>=AssignNum) &&
          (TempMax<MaxContinueLabelNum))
       {
           MaxContinueLabelNum=TempMax;
       Order=TempOrder;
       }
    }
}
    if(MaxContinueLabelNum>=AssignNum)
    {
       for(k=Order;k<31;k++)
       {
          LabelSpace=LabelSpace | (0x01<<k);
          change=change+1;
          if(change==AssignNum)
          {
             return 0;
          }
       }
    }
    else
    {
       return 1;
    }
}
```

In implementation of Assn Label Func( ) a short code (which is the underlined part in the above) in the function is deleted so as to simulate a branch missing error of the target program.

A form of the code having a defect is as follows:

```
int Assign_Label_Func(i nt AssignNum)
{
unsigned long int TempLabel;
int MaxContinueLabelNum=0, Order = 0;
int TempMax=0, TempOrder=0;
int Flag=0, change=0, i, k;
TempLabel=LabelSpace;
```

-continued

```
for(i=0; i<32; i++)
{
        if((TempLabel & 0x01)==0)
    {
```

-continued

```
if(Flag== 1)
    {
  TempOrder=i;
    Flag=0;
    }
TempMax=TempMax+1;
    }
else
    {
if(Flag == 0)
        {
            {
                if(MaxContinueLabelNum<AssignNum)
                {
            if(TempMax>MaxContinueLabelNum)
                {
                        MaxContinueLabelNum=TempMax;
        Order=TempOrder;
                }
            }
    else
            {   if(MaxContinueLabelNum>AssignNum)
            {
            if((TempMax>=AssignNum) &&
(TempMax<MaxContinueLabelNum))
            {
                    MaxContinueLabelNum=TempMax;
Order=TempOrder;
            }
        }
        }
Flag=1;
TempMax=0;
        }
        }
    TempLabel=TempLabel>>1;
        }
    if(MaxContinueLabelNum>=AssignNum)
        {
    for(k=Order;k<=31;k++)
    {
    LabelSpace=LabelSpace | (0x01<<k);
    change=change+1;
    if(change==AssignNum)
    {
      return 0;
    }
        }
        }
        }
    else
    {
    return 1;
        }
    }
```

Because of the deletion, only one branch is deleted, and the error belongs to partial functional omission. However, the error cannot be found through path testing.

See Table 1: assuming a value of AssignNum is equal to 3, that is, three labels need to be distributed. A correct code should select range C. However, because the code in the above is deleted, the range C is directly ignored after a loop ends, and selection is started from range B.

TABLE 1

Visual table of display range of output values

| High bit | | | | | | | | | | | | | | | | | | | | | | | | | | | | | | | Low bit |
|---|---|---|---|---|---|---|---|---|---|---|---|---|---|---|---|---|---|---|---|---|---|---|---|---|---|---|---|---|---|---|---|
| 31 | | | | | | | | 23 | | | | | | | | 15 | | | | | | | | 7 | | | | | | | 0 |
| 0 | 0 | 0 | 1 | 1 | 0 | 0 | 0 | 0 | 1 | 1 | 0 | 0 | 1 | 1 | 0 | 0 | 0 | 0 | 0 | 0 | 0 | 0 | 0 | 1 | 1 | 0 | 0 | 1 | 1 | 1 | 0 | 0 |

C, B, A

The Assn_Label_Func( ) will be used as a tested function, and a short code is deleted in implementation of the function. Next, how to find code defects through the testing method of Embodiment 1 will be demonstrated.

As shown in Table 2 and Table 3, in the case of code defects, after input amounts are added to a test model and the target program respectively, Table 2 shows how many mismatches exist between the test model and the target program in statistical output values. Table 3 shows three greatest deviations in corresponding input amounts.

TABLE 2

Statistics of the number of deviations

| Input amount | Test model | Tested function |
|---|---|---|
| 300 | 102 | 120 |
| 400 | 11 | 59 |
| 600 | 0 | 1 |
| 800 | 0 | 1 |
| 1000 | 0 | 0 |

TABLE 3

Sorting table of values with deviations Conclusion:

| Input amount | Test model | Tested function |
|---|---|---|
| 300 | 4.213083 | 7.799121 |
|  | 4.033339 | 6.619030 |
|  | 4.000174 | 5.406788 |
| 400 | 1.982358 | 7.397024 |
|  | 1.824504 | 3.920164 |
|  | 1.754933 | 3.496230 |
| 600 | 0.726605 | 3.413557 |
|  | 0.666699 | 1.966824 |
|  | 0.626476 | 1.697753 |
| 800 | 0.515466 | 2.175928 |
|  | 0.512535 | 1.181333 |
|  | 0.420441 | 1.081029 |
| 1000 | 0.432175 | 1.651053 |
|  | 0.421512 | 0.848003 |
|  | 0.344354 | 0.801702 |

I, the results in Table 2 and Table 3 indicate: with the increase of learning amount, the test model tends to converge, and a deviation between the test model and the target program decreases.

II, under the same conditions, due to defects of the target program, the tested function cannot be output correctly, so the test model corresponding to the actual requirement is closer to a convergent shape and has a small deviation.

Embodiment 4

Figure 3:
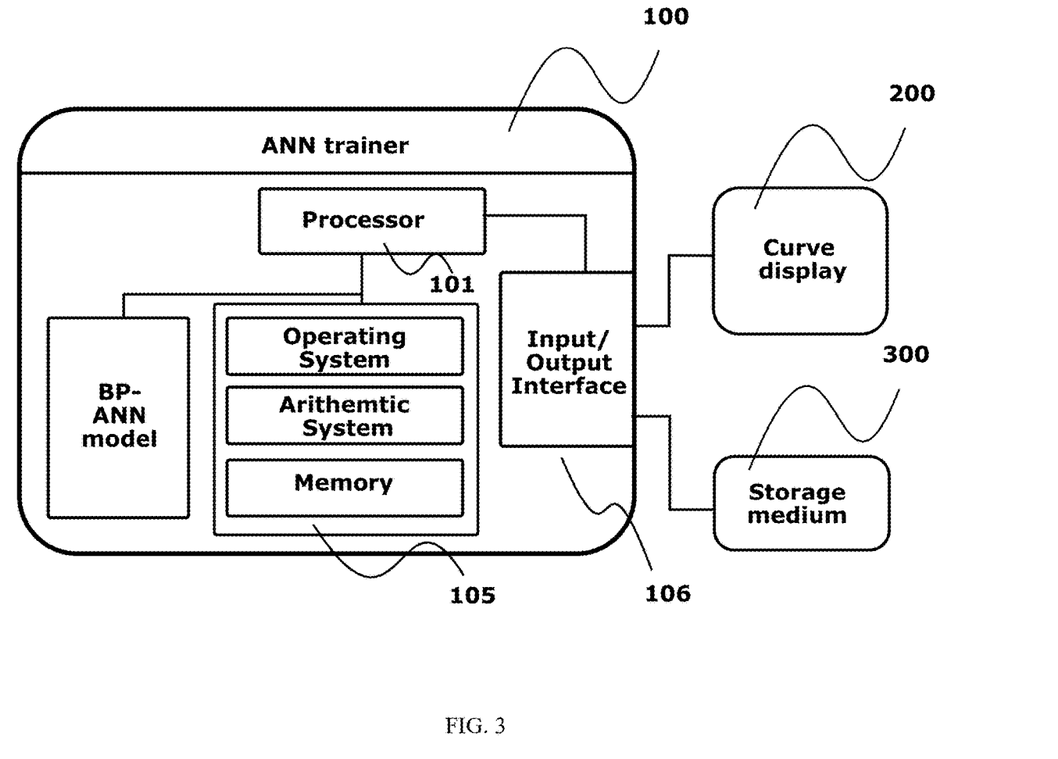
FIG. 3 is a schematic diagram of connection of a testing system in the solution.

As shown in FIG. 3, a testing system described below and the testing method described above may be mutually referenced. A program testing device includes: a memory 105 configured to store a computer program, and store program codes that need to be operated in the solution; and a processor 101 configured to implement the steps of the program testing method of the above method embodiment when executing the computer program.

An ANN trainer 100 may vary greatly due to different configurations or performance, and may include one or more processors 101 (for example, one or more central processing units (CPUs)), a memory 105, and a storage medium 300 configured to store a target program and a test model. The memory 105 and the storage medium 300 are capable of transient or persistent storage. Programs stored in the memory 105 may include one or more unit modules, and each unit module may include a separately executable target program.

Furthermore, the processor 101 may be in communication with the storage medium 300 via an input/output interface 106, and execute a series of instruction operations in the storage medium on the ANN trainer 100.

The ANN trainer 100 may run on a plurality of operating systems, such as Windows Server™, Mac OS X™, Unix™, Linux™ and FreeBSD™. The ANN trainer 100 is in communication with a curve display 200 via the input/output interface 106 so as to display a convergence degree of the test model.

The readable storage medium may specifically be a USB flash drive, a mobile hard disk drive, a read-only memory (ROM), a random access memory (RAM), a diskette, an optical disk, etc., which are capable of storing program codes.

Those skilled in the art may further realize that units and algorithm steps of various examples described with reference to the embodiments disclosed herein may be implemented in electronic hardware, computer software or a combination of both. To clearly illustrate interchangeability of hardware and software, compositions and steps of the various examples have been generally described in terms of functionality in the description. Whether the functions are executed in hardware or software depends on the specific application and design constraints of the technical solution. Those skilled in the art may use different methods to implement the described functions for each particular application, but such implementation should not be considered to be beyond the scope of the present disclosure.

What is claimed is:

1. An artificial neural network (ANN)-based program testing method, comprising:
S1: selecting an arithmetic unit with a 32-bit memory and conducting code and function implementation tests on a target program comprising a selected function that outputs data to the 32-bit memory, wherein 32-bit binary integers represented in the memory unit are used to generate a set of 32 labels having values of 1 or 0 according to the individual bits of the 32-bit binary integers as input values;
S2: using the input values of the 32 input labels as input values to the selected function to generate a set of 32 output values of the target program, and using an ANN trainer to construct an initial test model of an ANN wherein the input values and corresponding output values of the selected function of the target program are used as training samples, wherein the initial model is trained by means of adding training samples until the initial model is in a convergent state, and defining the resulting convergent model as the test model ANN;
S3: taking all possible combinations of input values, if the total number of possible combinations of input values of the target program is less than one million, or at least one million input values, if the total number of possible combinations of input values of the selected function of the target program is greater than one million, and computing output values using the test model ANN;
S4: inputting the test input values taken in S3 into the selected function of the target program, so as to obtain actual output values;
S5: comparing a test model ANN output value and an actual output value that correspond to the same input value for each input value to determine deviations; sorting deviations from largest to smallest selecting input values corresponding 50 to 150 of the largest deviations; thus obtaining selected test values for testing whether the selected function of the target program is correct;
S6: storing the selected test values in a readable storage medium for later copying; and
S7: transmitting the test values obtained in S6 to the selected function of the target program for running, and comparing running results with an actual functional requirement of the selected function of the target program; determining that the selected function of the target program has a defect under the condition that one of the running results does not satisfy the actual functional requirement of the selected function of the target program; and if not, determining that the selected function of the target program is a program satisfying a requirement of the selected function of the target program;
wherein in S2, the initial model of the ANN is a back propagation (BP) neural network model and comprises an input layer, a hidden layer and an output layer; the input values of the selected function of the target program are used as the input layer; the output values obtained by running the input values through the selected function of the target program are used as the output layer; and the number of nodes in each of the input layer and the output layer is 32;
wherein in, the training process, the BP neural network model uses an activation function $$f(x) = \frac{1}{1+e^{-x}};$$

when f(x) is less than 0.5, an output value of an output layer node is 0; and when f(x) is greater than or equal to 0.5, the output value of the output layer node is 1;
wherein an output value of the hidden layer of the BP neural network satisfies:

$$h_m = f\left(\sum_{j=0}^{32} i_j w(j, m)\right)(m = 1, 2, \ldots, k),$$

where i indicates a label received from a node of the input layer, w(j,m) indicates a weight from the input layer node to a hidden layer node, and k is the number of nodes in the hidden layer;

wherein an output value of the output layer of the BP neural network model satisfies:

$$o_n = f\left(\sum_{m=1}^{k} h_m w(m, n)\right)(n = 1, 2, \ldots, 32),$$

wherein w(m,n) indicates a weight for a hidden layer node to an output layer node;

wherein in S5, the deviation satisfies $$d = \sum_{n=1}^{32} |o'_n - o_n|,$$

wherein $o_n$ indicates an output value of function implementation, and $o'_n$ indicates an output value of the ANN.

2. The ANN-based program testing method according to claim 1, wherein in S2, in a process of training the BP neural network model, curve changes are observed by means of simulation software.

3. A testing system provided by the ANN-based program testing method according to claim 1 comprising: a program basic testing unit configured to preliminarily test a function of a target program and whether the program itself is wrong;
    an ANN trainer configured to store various training models, and obtain a convergence of the ANN model by means of training samples;
    a curve display that is in signal connection with the ANN trainer and configured to display a convergent state of a model curve in real time;
    a memory configured to store the target program, a test model itself and data generated in a running process;
    a processor configured to run the target program and the test model; and
    a readable storage medium configured to transfer data in all devices.

\* \* \* \* \*